United States Patent [19]

Disston, Jr. et al.

[11] 4,140,308
[45] Feb. 20, 1979

[54] WORK HOLD-DOWN IMPROVEMENTS

[76] Inventors: Horace C. Disston, Jr., Timothy J. Eichfeld, both of 207 W. Evesham Rd., Runnemede, N.J. 08078

[21] Appl. No.: 907,093

[22] Filed: May 18, 1978

[51] Int. Cl.² .................................................. B25B 1/00
[52] U.S. Cl. ...................................... 269/87.3; 269/97; 269/166; 408/97
[58] Field of Search .................... 269/91, 94, 97, 87.3, 269/166, 279–280, 282; 408/115, 109, 95, 97

[56] References Cited

U.S. PATENT DOCUMENTS

| 1,498,638 | 6/1924 | Periolat | 269/282 |
| 2,866,367 | 12/1958 | Wilkes | 269/91 |
| 4,025,064 | 5/1977 | Disston et al. | 269/87.3 |

Primary Examiner—Robert C. Watson
Attorney, Agent, or Firm—Robert K. Youtie

[57] ABSTRACT

A work hold-down for use with a drill press and like machine tools including a sleeve loosely slidable along a column and contractible for clamping to the column, an arm extending from the sleeve over a work table, and a presser depending from the arm remote from the sleeve for downward pressing engagement for a work piece on the table when the sleeve is contracted.

9 Claims, 6 Drawing Figures

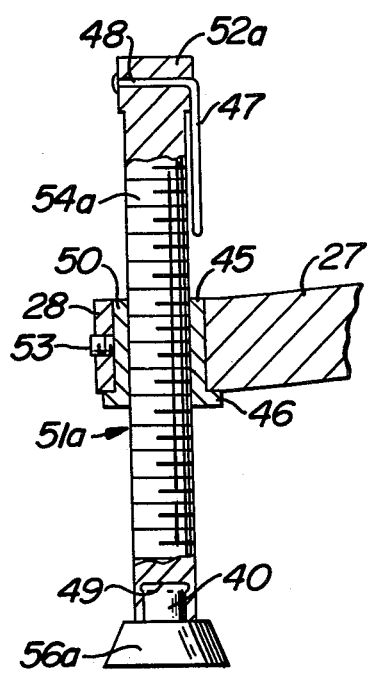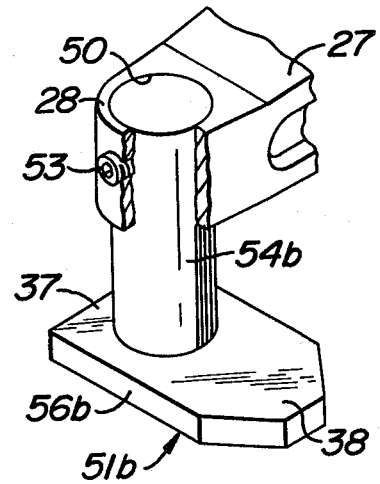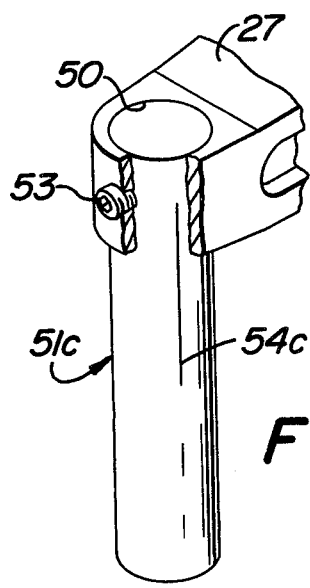

WORK HOLD-DOWN IMPROVEMENTS

BACKGROUND OF THE INVENTION

The instant invention is generally concerned with a work hold-down of the type disclosed in our prior U.S. Pat. No. 4,025,064. While the prior patented device has been found highly advantageous in many respects, including the ease and quickness of operation, and simplicity of structure, certain situations do arise where the prior patented device may lack optimum utility, say by reason of the work piece configuration, the work piece location on the work table, or the required pressure to hold the work piece against movement.

SUMMARY OF THE INVENTION

Accordingly, it is an important object of the present invention to provide a work hold-down of the type described, including certain unique improvements advantageously adapted for quickly, easily and releasably holding down work pieces of unstable shapes, work pieces positioned at widely varying locations on the work table, and work pieces requiring relatively high hold-down pressures to resist undesired movement.

It is among the further objects of the present invention to provide improvements in work hold-down devices having the advantageous characteristics mentioned in the preceding paragraph, which are extremely simple in construction, durable and reliable throughout a long useful life, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 4 is a sectional elevational view similar to FIG. 3, but showing a slightly modified embodiment of the present invention.

FIG. 5 is a top perspective view showing another slightly modified embodiment of the present invention, partly broken away for clarity of understanding.

FIG. 6 is a partial top perspective view showing still another embodiment, also partly broken away for clarity.

DESCRIPTION OF THE PREFERRED EMBODIMENTS

Figure 1:
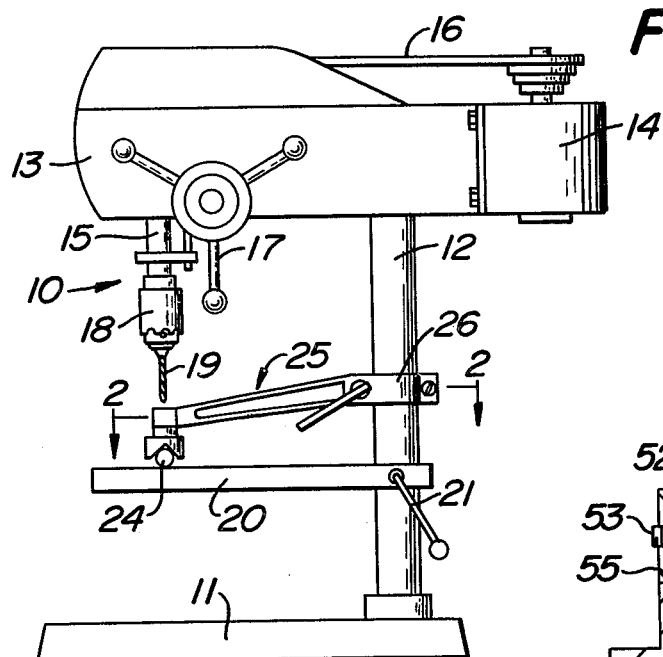
FIG. 1 is a side elevational view showing a machine tool, being a drill press in the illustrated embodiment, utilizing the improved work hold-down of the present invention.

Referring now more particularly to the drawings, and specifically to FIG. 1 thereof, a machine tool is there generally designated 10, and may include a lower support or base 11, from which rigidly upstands a generally cylindrical post or column 12. A radial arm 13 projects from an upper region of column 12, carrying at one end a drive means or motor 14 and carrying at its other end a depending rotary spindle 15. The spindle 15 may be operatively connected in driven relation to the motor 14, by suitable transmission means, such as a belt 16. The spindle 15, in addition to its axial rotation, is vertically shiftable, as by a hand wheel 17, and may carry a tool holder or chuck 18 on its lower end, being shown as provided with a tool bit or drill 19.

In addition, the machine tool 10 includes a generally horizontal work support or table 20 which may be adjustably fixed to and movable vertically along the column 12, by suitable holding means 21. As thus far described, the drill press 10 may be essentially conventional. Of course, other machine tool structures may be employed in conjunction with the instant invention, requiring only a work support and column or post.

Illustrated in position resting on the work table 20 is a work piece 24, and associated with the column 12 and work piece is a work hold-down, generally designated 25. The hold-down 25 may be essentially similar to the hold-down of U.S. Pat. No. 4,025,064, including an enlarged, open annular end portion or sleeve 26, best seen in FIG. 2, circumposed about column 12, and a generally radial extension or arm 27 projecting externally, generally radially from the sleeve to terminate in an end portion 28.

The sleeve 26 may be of split construction, including a generally semi-cylindrical sleeve part 35 extending integrally from arm 27, and an additional semi-cylindrical sleeve part 36 releasably connected to the sleeve part 35 for cooperation therewith to define a generally cylindrical internal surface in conforming clamping engagement about the column or post 12.

The sleeve parts 35 and 36 may be connected together at one pair of adjacent ends by suitable connector or tie means 41, and releasably connected together at their other pair of adjacent ends by lever means 42 selectively swingable about a pin 43 to rotate cam 44 and releasably contract the sleeve parts into binding engagement about the post 12.

As thus far described, the work hold-down may be essentially identical to that of prior U.S. Pat. No. 4,025,064.

Figure 3:
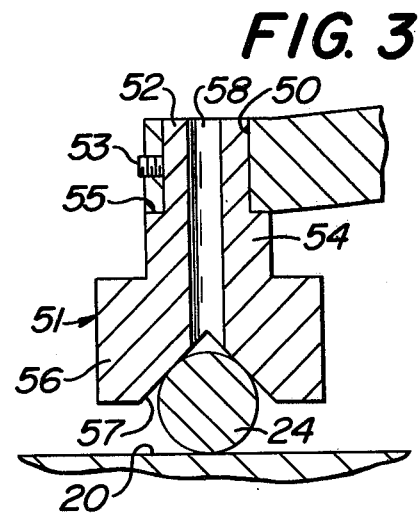
FIG. 3 is a partial sectional elevational view taken generally along the line 3—3 of FIG. 2.
Figure 2:
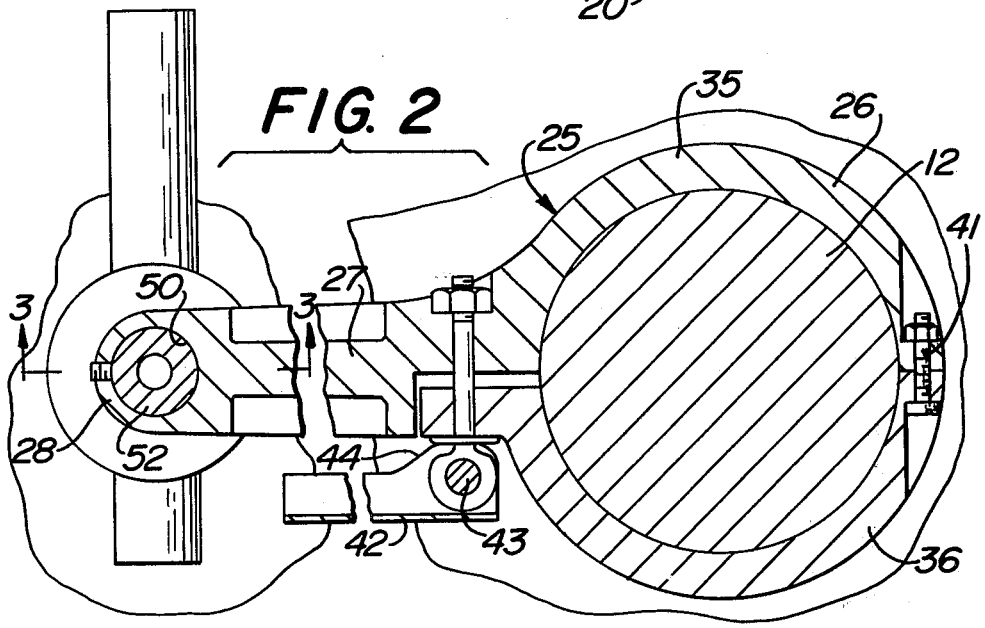
FIG. 2 is a horizontal sectional view taken generally along the line 2—2 of FIG. 1.

The distal or outer end region 28 of arm 27 is provided with a generally vertical through hole 50 which receives the upper end region of a work engager or presser, generally designated 51. That is, the work engaging member or presser 51 depends from the distal or outer arm end 28 into holding engagement with the work. In the embodiment of FIGS. 1-3, the presser 51 includes an upper reduced portion 52 upstanding slidably and rotatably into hole or opening 50 of the arm end 21. Suitable holding means, such as a set screw 53 may be threaded generally radially through the arm end 28 into releasable holding engagement with the presser end portion 52. Depending from the presser upper end portion 52, generally coaxially therewith, is a shank or leg 54, being somewhat enlarged relative to the upper end portion 52 and combining therewith to define an upwardly facing annular shoulder 55 for abutting engagement with the under surface of arm end portion 28.

A lower end enlargement or foot 56 is provided on the lower end of shank or leg 54, being formed on its underside with a downwardly facing work holding conformation, in the illustrated embodiment being an inverted V-shaped groove 57 for firm holding engagement with a cylindrical work piece or rod 24 resting on work table 20.

Of course, the entire presser 51 may be rotated about a generally vertical axis, coaxially of the hole 50 for engagement with a work piece 24 and various orientations of the latter. In addition, a generally vertically extending through guide hole 58 extends generally coaxially through the presser 51, specifically entering centrally of the upper presser end portion 52, passing downwardly through shank or leg 54, and thence through presser foot 56, exiting into groove 57 at the apex thereof.

As described in said U.S. Pat. No. 4,025,064, the arm 25 may have its sleeve 26 opened or released, as by swinging lever 42, such that the sleeve 25 will fall downward on the post or column 12 to a tilted or canted condition, with the arm 27 having its outer end 28 supported by the presser 51 on work piece 24. Upon tightening or clamping of the split sleeve 25 by contraction thereof on operation of lever 42, the arm 27 tends to have its outer end 28 swing downwardly for firm pressing and holding engagement of the presser 51 with the work piece 24.

In the embodiment shown in FIG. 4, a presser is there generally designated 51a, and includes an internally threaded sleeve or bushing 45 having a generally cylindrical external surface conformably engaged in the hole 50 of the outer end 28 of arm 27. The bushing or sleeve 45 may advantageously have a lower end flange 46 extending exteriorly about the bushing in abutting engagement with the underside of arm end portion 28; and, holding means may releasably secure the bushing in hole 50. Suitable holding means may be constituted of a set screw 53.

The presser 51a may include an elongate shank or leg 54a extending through bushing 45 and being externally threaded for threaded engagement with the internal threads of bushing 45. An upper end portion or head 52a on threaded shank 54a may be slightly enlarged with respect to the shank or leg, above the bushing 45 to prevent passage therethrough, and provided with a suitable turning arm or lever 47 for manually rotating the shank. The arm or lever 47 may be angulate, including an angulately disposed portion 48 extending rotatably through the enlarged upper end head 52a, to mount the arm for swinging movement between an outstanding operative, manually actuable position, and a inoperative position depending closely along the shank, as illustrated. The inoperative position advantageously presents less obstacle to machining operations.

The lower end of shank 54a is provided with a downwardly facing socket 49, and depending beneath the shank from its lower end is a lower end enlargement or foot 56a. A button 40 extends upwardly from the foot 56a into the socket 49 for rotatably retaining the foot on the lower end of the leg.

Thus, the presser 51a may be caused to have its lower end or foot 56a bear against a work piece, in the manner described hereinbefore in connection with the embodiment of FIGS. 1-3; and further, additional work piece holding force may be applied by manipulation of turning arm or handle 47 to rotate the leg or shank 54a, to urge the latter downwardly with its foot 56a in increased bearing engagement with a work piece, while the foot is held against rotation in its bearing engagement. Of course, the upward reaction force on the leg 54a is effectively resisted by the interengaging screw threads of sleeve or collar 45 and the leg, as well as the bushing flange or shoulder 46 against the underside of arm end portion 28.

Considering now the embodiment shown in FIG. 5, the arm 27 may have, inserted into the hole 50 of end portion 28, a generally vertically disposed leg or shank 54b of presser 51b. The shank or leg 54b may be a generally cylindrical member or rod suitably retained against movement in hole 50 by appropriate holding means, such as a setscrew 53. The lower end of the shank or leg 54b may be provided with a foot 56b, which may assume the configuration of a generally flat, substantially horizontally disposed plate 37 fixedly secured to the lower end of leg 54b and disposed in a plane generally normal to the latter. The plate 37 of foot 56b may extend in one direction radially with respect to the leg or shank 54b, as by extension 38, which configuration has been found to afford a wide degree of versatility in work holding function.

Still another embodiment of the instant invention is shown in FIG. 6, wherein arm 27 is provided through its end hole 50 with one end of a presser generally designated 51c.

The presser 51c may be constituted of a generally vertically disposed elongate member or leg 54c, which may be fabricated of rod stock, having its upper end releasably secured in the hole 50 by suitable securing means, such as a setscrew 53. The lower end of leg 54c may define a downwardly facing foot 51c for effective, highly localized work holding bearing engagement.

While the illustrations and description herein disclose only a single device of the present invention in use, it is appreciated that two or more devices of the invention may be simultaneously utilized. For example, a pair of arms 27 may be mounted on the column 12, each carrying a separate engager or presser. Of course, the upper arm may require a presser or work engager of greater vertical extent.

From the foregoing, it is seen that the present invention provides a highly improved work hold-down which affords great versatility in use without sacrificing ease and speed in operation, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A work hold-down for use with a machine tool having a work table and an upstanding column, said work hold-down comprising a sleeve having an internal dimension greater than the external dimension of and loosely circumposed about a machine tool column for sliding therealong and tiltable about a generally horizontal axis between a longitudinal position relative to and slidable on the column and a canted position jammed against upward movement along the column, said sleeve being releasably contractible about said column to urge the sleeve from its canted position toward its longitudinal position, an arm extending from said sleeve for location over said table and movable with said sleeve between an outstanding position and an upwardly swung position upon sleeve movement between respective longitudinal and canted positions, and a presser depending from said arm remote from said sleeve for downward pressing engagement with a work piece on the table when said sleeve is contracted.

2. A work hold-down according to claim 1, said presser comprising a leg removably inserted into and depending from said arm.

3. A work hold-down according to claim 2, in combination with a foot on the lower end of said leg for distributing bearing engagement with a work piece.

4. A work hold-down according to claim 3, said foot being generally planar.

5. A work hold-down according to claim 3, said foot having a downwardly facing groove for receiving engagement with a work piece.

6. A work hold-down according to claim 5, said groove being generally V-shaped for holding engagement with rod stock.

7. A work hold-down according to claim 1, said presser extending in threaded engagement with said arm for increasing the force of pressing engagement with a work piece.

8. A work hold-down according to claim 7, said presser comprising an externally threaded shank, an internally threaded bushing circumposed about and in threaded engagement with said shank, said bushing being releasably secured to said arm.

9. A work hold-down according to claim 8, said shank having opposite end enlargements retaining said bushing on said shank, and retractible handle means on the upper end enlargement of said shank for manually rotating the latter.

* * * * *